July 21, 1970  C. W. FROBESE  3,521,074
DEFECT DETECTOR WITH ROTATING SCANNER
Filed April 19, 1968  4 Sheets-Sheet 1

INVENTOR.
CHARLES W. FROBESE
BY *Robert H. Clay*
ATTORNEY

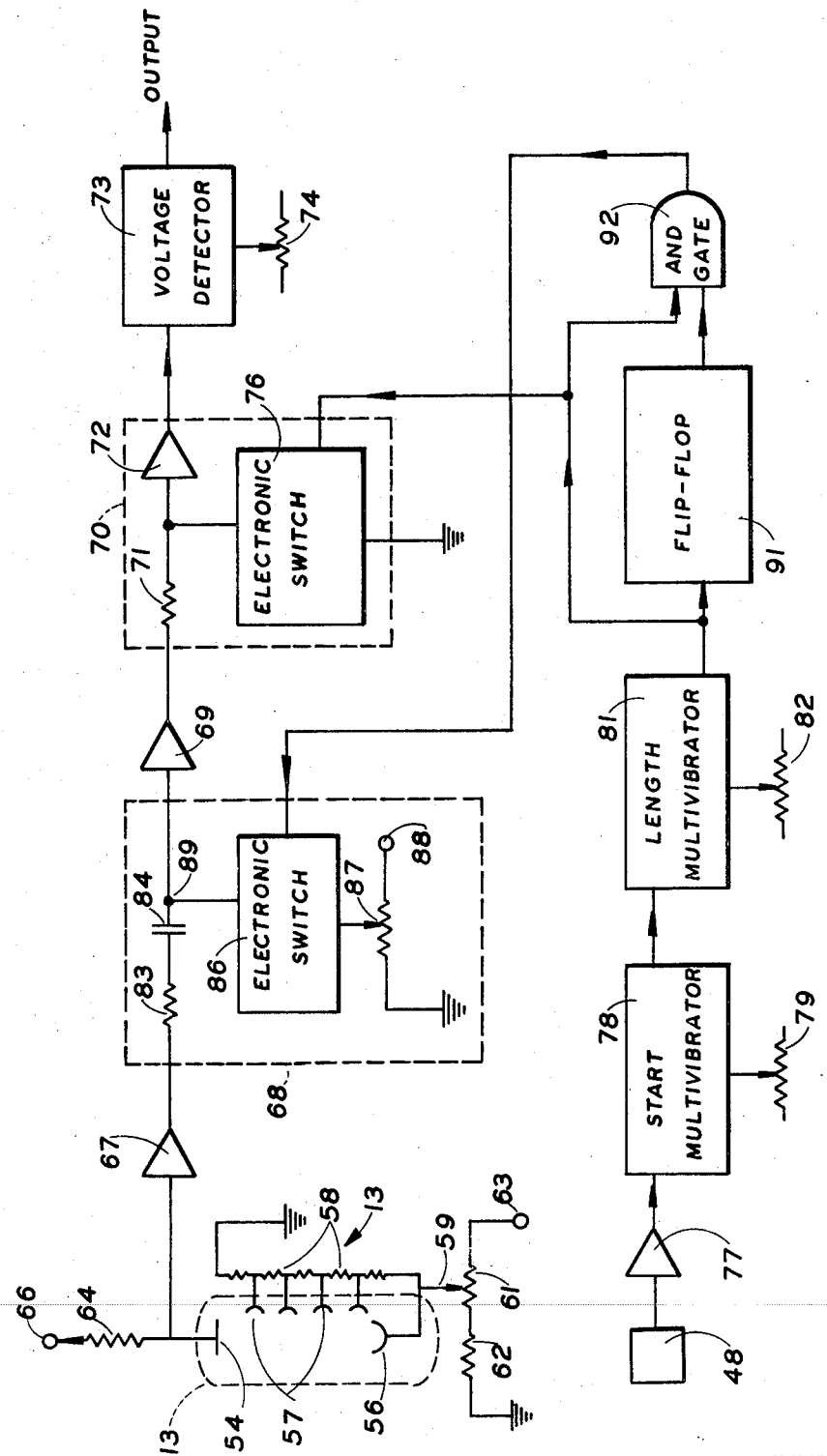

July 21, 1970  C. W. FROBESE  3,521,074
DEFECT DETECTOR WITH ROTATING SCANNER
Filed April 19, 1968  4 Sheets-Sheet 3

INVENTOR.
CHARLES W. FROBESE
BY
Robert H. Clay
ATTORNEY

INVENTOR.
CHARLES W. FROBESE
BY Robert H. Clay
ATTORNEY

United States Patent Office 3,521,074
Patented July 21, 1970

3,521,074
DEFECT DETECTOR WITH ROTATING SCANNER
Charles W. Frobese, Houston, Tex., assignor to Mandrel Industries, Inc., Houston, Tex., a corporation of Michigan
Filed Apr. 19, 1968, Ser. No. 722,791
Int. Cl. G01n 71/16
U.S. Cl. 250—219      14 Claims

ABSTRACT OF THE DISCLOSURE

Apparatus is described for detecting blemishes on a surface. A sensor examines an image of an area of the surface which is about equal in area to the area of the smallest blemish to be detected. The imaged area of the surface which the detector sees is swept over the surface by means of a movable reflector positioned in the light path between the surface and the detector.

---

This invention relates to detecting apparatus and, more particularly, to improved apparatus for detecting blemishes on a surface, such as may be used in combination with inspecting or sorting devices.

Various types of apparatus utilizing light detection techniques have been developed to detect such things as spots, stains and surface imperfections (hereinafter referred to generically as blemishes) in which the amount of light reflected therefrom is different from the surrounding surface. Blemish detecting apparatus may be utilized in connection with sorting devices for sorting objects of various shapes to separate those objects having undesirable surface characteristics. Blemish detecting apparatus may also be utilized for inspecting filaments or sheets of material such as paper, yarn and rope.

Blemish detecting apparatus which is known in the art, although satisfactory in many instances, has nevertheless exhibited certain shortcomings. For example, one known type of blemish detecting apparatus uses a slit or elongated aperture that is as long as the surface being inspected is wide, and which is as wide as the width of the smallest blemish to be detected. As the object moves relative to the viewing aperture, the entire surface comes within the purview of the aperture. The presence of a blemish within the area which the aperture sees causes a change in the illumination which is sensed to produce a signal indicating the presence of a blemish. If the surface is large and the blemishes relatively small, fluctuation of light off the surface being inspected due to variations in illumination or erratic motion of the surface may cause signal fluctuations equal to or greater than signal changes due to the presence of a blemish. Accordingly, spurious signal may be produced and cause rejection of unblemished objects or filament sections. If the sensitivity is decreased to avoid production of spurious signals, some blemishes may go undetected.

As another example of difficulties present in prior art devices, a further type of known blemish detecting apparatus utilizes a matrix of small solid state photocells arranged so that they form a viewing area similar in configuration to the slit or elongated aperture described above. Each cell therefore sees only a narrow strip of the surface being inspected as the surface is moved past the matrix. The cells are connected so that any cell that sees a blemish may produce an output signal to trigger a rejection device or similar mechanism. Although such apparatus has good sensitivity without a high incidence of spurious response, nevertheless, where a fast photocell response is required, solid state photocells may tend to be too expensive. Moreover, the higher priced silicon solid state photocells are frequently relatively insensitive to blue light which may require extremely large light sources if the surface is to be inspected at the blue end of the light spectrum. In addition, difficulties may be encountered in standardizing or normalizing the matrix of solid state photocells to take into account fluctuating reflected light level due to variations in illumination or erratic movement of the surface being inspected.

One other type of prior art apparatus will be mentioned, by way of example. Such apparatus utilizes a slit of elongated aperture as in the first described apparatus in combination with a rotating disc. The disc is provided with a plurality of holes in it and, as the disc is rotated with respect to the frame, the slit is scanned lengthwise by the movement of the holes in the disc. A suitable lens system and photocell are positioned to collect the light passing through the holes in the rotating disc. Such a system provides good sensitivity without producing spurious responses. However, the source of the light entering the lens system changes its position over a relatively large range with movement of the holes through which the light passes. Accordingly, a sufficiently large lens that produces an image with very low vignetting or fall-off in quality or brightness throughout the entire length of the slit must ordinarily be utilized. This adds considerable size and expense in many circumstances.

It is therefore an object of this invention to provide improved apparatus for detecting blemishes on a surface.

Another object of the invention is to provide blemish detecting apparatus of high sensitivity and which is relatively insensitive to fluctuations in reflected light level and erratic motions of the surface being inspected.

A further object of the invention is to provide blemish detecting apparatus with high sensitivity and in which the problem of lens vignetting is minimal.

A still further object of the invention is to provide blemish detecting apparatus which is low in cost and which has a relatively rapid response.

It is another object of the invention to provide blemish detecting apparatus which is rapid in response and which is automatically normalized to take into account fluctuating reflected light.

Other objects of the invention will become apparent to those skilled in the art from the following description taken in connection with the accompanying drawings wherein:

FIG. 3 is a block diagram of circuitry used in the apparatus of the invention;

Very generally, the blemish detecting apparatus of the invention includes means 11 for producing an image, of an area of the surface 12 being inspected, which is about equal in area to the area of the smallest blemish to be detected. Means 13 are provided for sensing the illumination level of the image thus produced. Reflecting means 14 are adapted to be positioned to direct the light path between the surface and the sensing means. Means 16 are provided for moving the reflecting means in a predetermined sweep pattern to change the imaged area of the surface which the sensing means sees.

Figure 1:
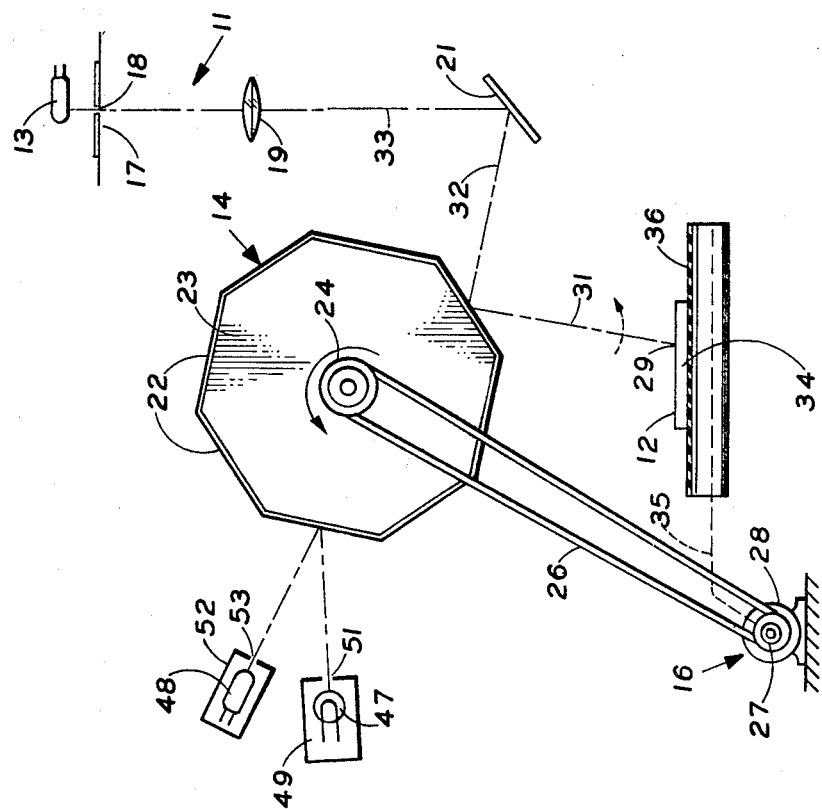
FIG. 1 is a schematic view of apparatus constructed in accordance with the invention.
Figure 2:
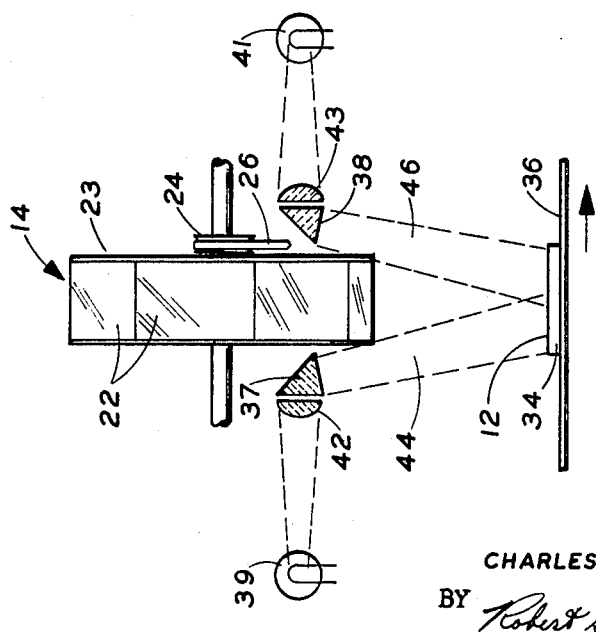
FIG. 2 is an end schematic view of the apparatus of FIG. 1.

Referring now more particularly to FIGS. 1 and 2, the image producing means 11 includes an opaque plate 17 of a suitable material defining an aperture 18. A lens 19 is positioned in alignment with the aperture 18 to focus an image of the surface 12 in or near the plane of the apertured plate 17. If desired, a combination of lenses may be utilized rather than the single lens 19 as shown. Also included in the image producing means is a mirror 21 positioned with its reflective surface at approximately 45° to the lens-aperture axis. The mirror 21, lens 19, and aperture plate 17 are fixed relative to the movement of the surface 12, as described below, and the light rays passing through the aperture 18, as will be apparent from the description which follows, always pass through the same part of the lens 19 and from the same direction. This greatly reduces the size and quality of the lens which is required, and vignetting of the image which passes the aperture by the lens is minimal.

In order to sense the illumination level of the image defined by the aperture 18, the sensing means 13 are positioned behind the plate 17 in alignment with the aperture 18 and the lens 19. The sensing means 13 are illustrated as including a photomultiplier of any suitable design. The aperture 18 is of a size which is about equal in area to the area of the smallest blemish to be detected. Accordingly if, during the sweeping procedure described below, a blemish moves into the imaged area which the sensing means or photomultiplier 13 sees, the output of the photomultiplier will change correspondingly. This output signal may be compared, as described below, to a reference level and, when sufficient deviation from the reference is present, a signal may be produced for operating a suitable rejection device, not illustrated.

In order to direct the light path from the surface 12 to the sensing means 11, the reflecting means 14 are positioned between the surface and the sensing means. The reflecting means are moved in a predetermined sweep pattern so that the imaged area of the surface which the sensing means 13 sees through the aperture 18 is changed. In the illustrated embodiment, the reflecting means 14 comprise a mirror having a plurality of planar sections 22 arranged about the periphery of a support member 23 to form an octagonal outer reflecting surface. The support member 23 is rotated by means of a pulley 24 coupled by a belt 26 to the drive pulley 27 of a motor 28. The direction of rotation is indicated by the arrow in FIG. 1 on the rotary member.

It may be seen by observing FIG. 1 that, as the support member 23 rotates, successive ones of the mirror sections 22 are brought into position for deflecting an image of the surface 12 onto the mirror 21 and from thence through the lens 19 and aperture 18 to the photomultiplier 13. As the angular position of the particular mirror section changes, the area which the photomultiplier 13 sees through the aperture 18 is moved from left to right in FIG. 1. The particular light path from an image at the region 29 on the surface 12 is indicated by the lines 31, 32 and 33. The effect of movement of the mirror section is to shift the line 31 in the direction of the arrow crossing it. The effect is a sweeping, from left to right in FIG. 1, as each succeeding mirror segment moves into and through the proper position. At the same time, the object 34 having the surface 12 being inspected is moved in a direction into the plane of the paper in FIG. 1 by suitable operation of a conveyor 36 upon which the object 34 rests. Such movement is selected, for reasons which will be explained subsequently, so that the surface 12 moves no more than one-half the width of the aperture 18 for each left to right sweep of the optical line 31. A drive arrangement, indicated schematically at 35, from the drive motor 28 to the conveyor 36 may be provided to maintain their motions at a desired relationship. The conveyor movement may be linear, as shown, or may be of any other type suitable for scanning the surface to be inspected. For example, cylindrical objects may be inspected by utilizing a conveyor which rotates the object about an axis of rotation of the support member 23. Suitable means, not illustrated, such as a mechanical contact switch device or a photocell, may be provided for initiating operation of the detecting apparatus when an object to be inspected is present, and for stopping such operation when the inspection is complete.

In order to avoid spurious response from the detecting apparatus, it is important that the surface being inspected be adequately and uniformly illuminated throughout the sweep thereof. Uniform illumination may be difficult, where the surface being inspected is irregular, due to the difficulty of illuminating valleys therein. To solve the problem of uniform illumination, a lens and mirror system may be designed utilizing the reflex principle to provide illumination which is parallel with the viewing line. Contamination on the surfaces of the mirror 14, however, can result in a spurious response in a reflex system if such contaminations move into the path of light from the surface to the aperture 18. The next best solution is to provide illumination that is as close as possible to the ideal parallel illumination. Most lamp bulbs, however, because of their glass envelope, are limited in how close they may be brought to the rotating mirror 14 to provide the desired illumination angle.

Referring particularly to FIG. 2, the apparatus of the invention solves the foregoing mentioned illumination problem by utilizing a pair of prisms 37 and 38 disposed on opposite sides of the rotary member 23. Light from a pair of lamp bulbs 39 and 31 is condensed by condensing lenses 42 and 43 to enter the prism with the light rays generally parallel. The prism reflects the light rays to project them at the surface 12 as indicated at 44 and 46. By suitable design, the prisms 37 and 38 may be brought very close to the rotary member 23 so that the illumination path is almost parallel with the viewing line. With two lamps and two prisms, shadows are minimized and the valleys and cracks in the surface 12 are adequately and uniformly illuminated.

It will be noted that, as the mirror 14 rotates, the length of the optical arm from the lens 19 to the surface 12 changes. This changes the focus of the image and changes the magnification ratio of the image. Accordingly, it is advisable that a small diameter lens be used to reduce the effect of defocusing due to the change in object distance. It is also advisable that a long focal length lens be used to reduce the change in magnification and light gathering power of the lens as the object distance changes.

The rotating mirror 14 is positioned at a place in the optical path that will produce a sweep length that is several times the length of the object 34, that is, the left to right dimension in FIG. 1. This is done so that vignetting, that occurs when the image of the intersection of adjacent sections 22 of the mirror 14 approaches the aperture 18, does not occur while any of the object surface is in view, but occurs only when areas beyond the object surface in both directions are in view. This overlap at both ends of the sweep is taken care of by a gating arrangement, subsequently described, which deletes the undesired part of the sweep.

The gating arrangement for deleting undesired portions of the sweep is triggered by a gate lamp 47 and a gate photocell 48. The gate lamp is disposed in a housing 49 having a small aperture 51 therein. Similarly, the gate photocell is disposed in an opaque housing 52 having a small aperture 53 therein. The two apertures 51 and 53 are positioned so that the gate photocell will receive light from the gate lamp at only one angular position of each section 22 of the mirror 14. As the mirror rotates, a pulse is generated by the gate photocell each time a mirror section goes by. This pulse is utilized to start the sensing period by having the gating pulse occur earlier than the desired beginning of the sensing period and driving a delay multivibrator (described below) which determines the start position of the sensing period. In this manner, the multivibrator may be readily adjusted to precisely position the beginning of the sensing period. A similar multivibrator (described below), which is triggered at the beginning of the sensing period may be used to set the length of the sensing period. As an alternative to the foregoing described arrangement, the pulse produced by the photocell 48 may be used to start the sensing period by having the pulse occur when the beginning edge of the object comes into view through the aperture 18.

Referring now to FIG. 3, the general arrangement of the electrical system used in the invention may be seen. The photomultiplier 13, for which a solid state photocell may be substituted, includes a plate 54, a primary cathode 56, and a plurality of secondary cathodes or dynodes 57 connected at points distributed along a voltage divider 58. The voltage divider 58 is connected from a variable tap 59 to ground and the voltage applied across the voltage divider 58 is regulated by adjusting the tap 59. The tap forms a portion of a potentiometer 61 which is connected in series with a resistor 62 between a source 63 of high negative potential and ground. The plate 54 is connected through a resistor 64 to a source of positive potential 66. The plate is also connected to a photo-tube amplifier 67.

Variations in the amount of light sensed by the photomultiplier 13 produce corresponding variations in the amount of signal applied to the amplifier 67. The output of the amplifier 67 is applied through a normalizer 68, explained more fully below, to an amplifier 69 which has a relatively high input impedance, for reasons explained below. The output of the amplifier 69 is fed through a gate 70 to a voltage detector 73. The gate 70 includes a resistor 71 and an amplifier 72 series connected between the amplifier 69 and the voltage detector 73. The juncture between the resistor 71 and the amplifier 72 is grounded through an electronic switch 76.

The voltage detector 73 is a suitable voltage sensitive device that changes state once the input has exceeded a preset value, made adjustable by a suitable potentiometer 74 shown schematically. The form of the detector is dependent upon the type of signal needed to drive the particular sorting or rejection device used, such depending upon the nature of the object or objects being inspected. If the object being inspected is continuous, such as an elongated filament or strip of paper or fabric, and if the rejection device is such as to act on only that portion of the strip or filament having a defect, the detector may comprise a Schmitt trigger circuit. Such a circuit will automatically reset itself as soon as the defect is passed. If the object being inspected is one of many discreet objects and if a blemished object is to be removed individually by a suitable ejector mechanism, the detector 73 may comprise a resettable bistable device, such as a flip-flop or a suitably connected controlled rectifier. The voltage detector thereby changes state as soon as a blemish is seen and stays in that state until it is reset after the entire object has been scanned. The voltage detector 73 may be returned to the non-rejection state as soon as another object to be scanned arrives at the proper position.

As previously mentioned, provision is made for gating the circuitry in such a manner that actual sensing takes place only during the time the surface of the object is being passed before the image producing means. Gating is accomplished by the gate 70 including the electronic switch 76 which is attached to the juncture between the resistor 71 and the input to the amplifier 72 for shunting signals to ground. The pulse produced by the gating photocell 48, which is synchronized with the movement of the mirror 14, is applied through an amplifier 77 to a sensing period start one-shot multivibrator 78. The one-shot multivibrator 78 incorporates a delay which is adjustable by means of a potentiometer 79 indicated schematically. In response to an input pulse, the one-shot multivibrator 78, after the adjustable delay period, provides an output which is applied to a sensing period length one-shot multivibrator 81. In response to receipt of this pulse, the multivibrator 81 provides an output, the duration of which is adjustable by a suitable potentiometer 82, indicated schematically in the drawings. The output of the multivibrator 81 is applied to the electronic switch 76, to hold the switch open for the appropriate length of time for the sensing period during the sweep.

Figure 4:
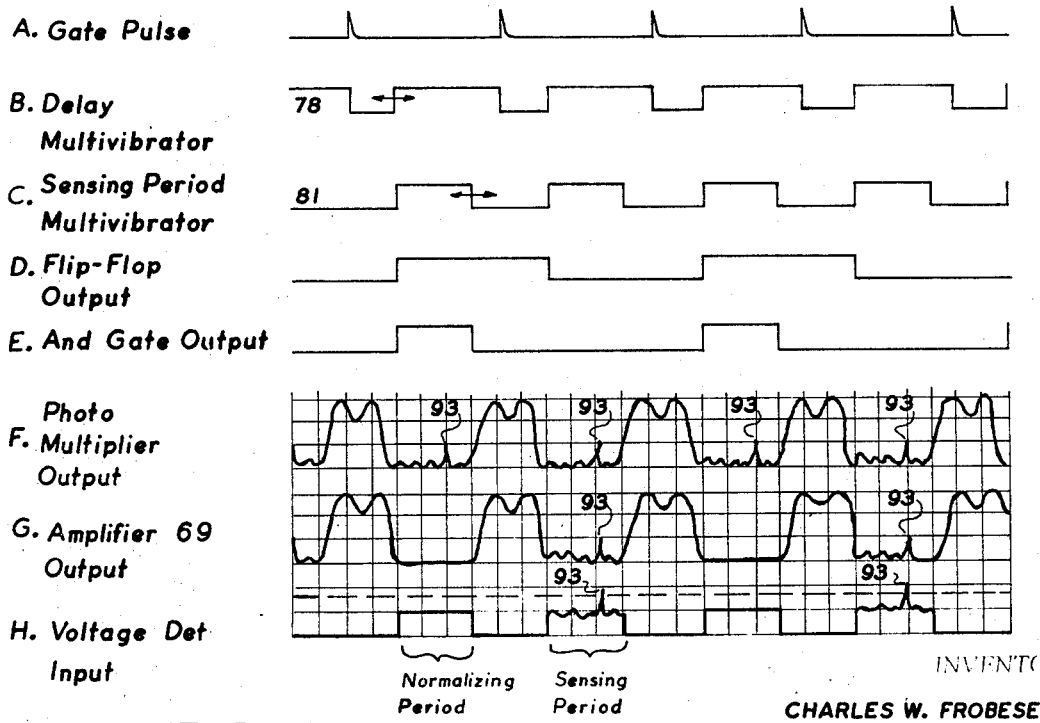
FIG. 4 is a series of graphs illustrating the operation of the circuitry illustrated in FIG. 3.

The relationship of the various pulses may be observed in FIG. 4 by comparing the graphs A, B, C and H. It will be seen that the beginning of the rise in voltage input through the voltage detector coincides with the leading edge of the one-shot multivibrator 78, the position of this edge being adjustable, as indicated by the arrows. Similarly, the trailing edge of the voltage input to the voltage detector is controlled by the trailing edge of the square wave output of the multivibrator 81, such being adjustable as indicated by the arrows in FIG. 4C.

For reliable and accurate operation, it is desirable that the input to the voltage detector 73 be maintained in calibration with a precise reference value, so that the darkness of blemishes is measured against an unvarying standard. Various influences may cause the photomultiplier 13 to drift with time. If the conveyor employs a transparent fluid for conveying the objects, rather than a belt or moving table as in the illustrated embodiments, the fluid may become contaminated and thus reduce light transmission. The bulbs 39 and 41 may tend to decrease in output with age, causing a gradual decrease in the illumination level of the surface being inspected. The output of the photomultiplier 13 may be unstable or may vary in gain. Accordingly, the normalizer 68 is provided between the amplifiers 67 and 69 for automatically normalizing or recalibrating the photomultiplier 13 from time to time.

Where the objects being scanned have relatively small surfaces, it may be possible during the time between objects to normalize or recalibrate. Where the surface is large, however, such as where many sweeps over the surface take place, it may be desirable to normalize more frequently. The normalizer 68 of the invention includes a resistor 83 and a capacitor 84 series connected between the output of the amplifier 67 and the input of the high impedance amplifiers 69. An electronic switch 86 is connected from the juncture between the capacitor 84 and the amplifier 69 to the variable tap of a potentiometer 87. The potentiometer 87 is coupled at one end to a source of bias voltage 88 and enables adjustment of the bias voltage at the point 89 through the electronic switch 86. The electronic switch 86 is bidirectional and may comprise, for example, a suitable field effect device. When the switch 86 is gated on, the point 89 is connected through the variable resistor 87 to the bias source 8. Under such circumstances, the capacitor 84 takes on a charge that is equal to the difference of potential between the output of the photocell amplifier 67 and the bias voltage at the tap of the potentiometer 87.

The normalization process, which is described below, takes place every other sweep of the image on the surface 12. This is possible because, as mentioned before, the conveyor is operated so that the conveyor travels no more than one-half the width of the aperture 18 during each sweep. The electronic switch 86 is operated on and off in a manner such that it is on during every other sweep. To accomplish this, the sensing period length multivibrator 81 is connected to the input or trigger connection of a bistable device or flip-flop 91. The flip-flop 91 is of the type which toggles or changes state to on or off upon receipt of successive pulses. The output of the sensing period length multivibrator 81 is also bypassed around the flip-flop 91 to one input of an AND gate 92. The output of the bistable flip-flop 91 is applied to the other input of the AND gate 92. The output of the AND gate 92 is applied to the bidirectional switch 86 and, when the AND gate applies a pulse thereto, the switch 86 is closed during the sensing period. The AND gate will provide an output, however, only in the presence of a signal at both its inputs. Accordingly, the AND gate will provide an output for closing the bidirectional switch 86 only during every other sensing period. This operation, as just described, may be understood by comparing the graphs C, D and E of FIG. 4.

During the normalizing process, with the electronic bidirectional switch 86 closed, the charge which builds up across the capacitor 84 during the sensing period is approximately equal to the average of the light signal received during the time that the switch 86 is closed. This is accomplished by selecting components such that the time constant, of the coupling capacitor 84 and the series resistance of the phototube amplifier 67 and electronic switch 86, is approximately equal to the sweep time across the surface. To prevent the charge on the coupling capacitor 84 from changing during the time that the switch 86 is open, the time constant, of the coupling capacitor 84 and the input impedance of the amplifier 69, is selected to be of sufficient length to prevent the charge on the coupling capacitor from changing during two sensing periods.

Because the input of the normalizer amplifier 69 is connected to the reference bias source at the potentiometer 87 during every other sensing period, any change in light level due to contamination of the optical elements or movement of the object is cancelled out.

The graphs F, G and H of FIG. 4 illustrate the normalizing operation. It will be seen from the graph F that the photomultiplier output indicates the presence of a blemish at the peaks 93 during each sensing period. Such a blemish, providing repetitive indications, could be a line extending transversely of the sweep direction. During the normalizing periods, however, the output of the high impedance normalizer amplifier 69 is level, as is the input to the voltage detector 73 (graph H). This level, selected by adjusting the bias potentiometer 87, is below the trip level indicated by the dotted line in the graph H. It may also be noted at this point that the electronic switch 76, during normalizing periods, drops the voltage input to the voltage detector 73 to 0. During the non-normalizing periods, it may also be observed that the photomultiplier output modulates the voltage across the capacitor 84. The resulting signal is amplified by the high impedance amplifier 69 and applied to the voltage detector 73 as indicated in the graph H. The peak 93 is present during the non-normalizing period and, by suitable adjustment of the reference level of the voltage detector, exceeds the trip level of the voltage detector. As a result, the voltage detector provides an output for rejecting the appropriate object or section of filament or sheet.

Figure 5:
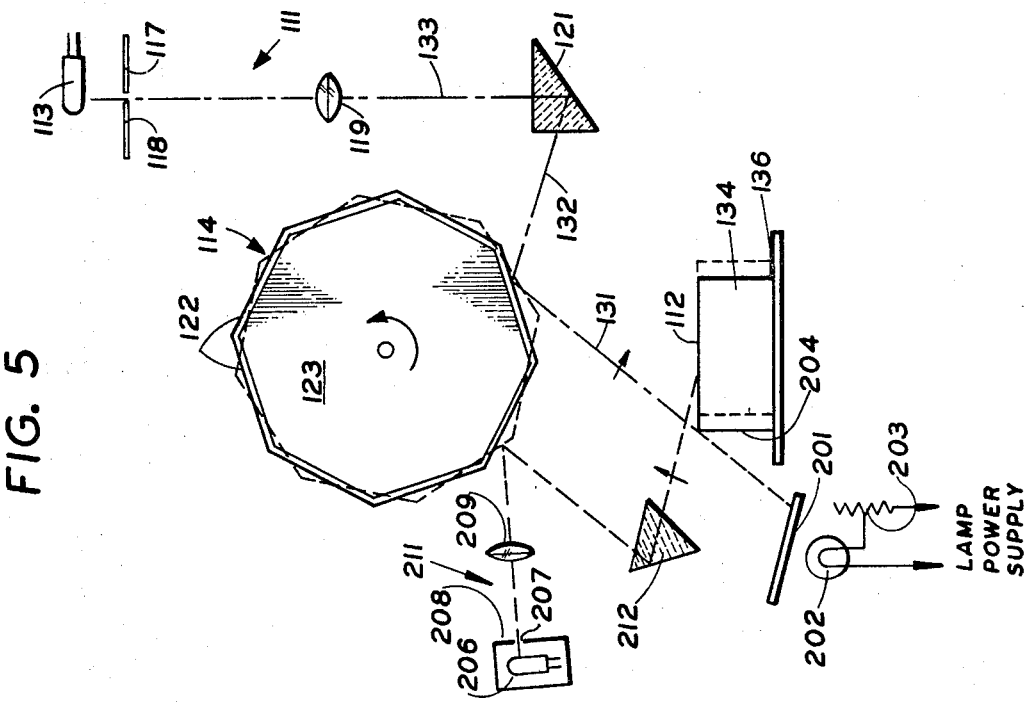
FIG. 5 is a schematic illustration of a further embodiment of the invention.

In FIG. 5, a further embodiment of the invention is illustrated. The embodiment of FIG. 5 is for scanning more than one surface of an object by using two sections of the mirror simultaneously. In FIG. 5, items similar in function to items in FIG. 1 have been given the same reference numbers preceded by a 1. Thus, the top surface 112 of the object 134 on the conveyor 136 is inspected by the photomultiplier 113 and the image producing means 111. The image producing means include an opaque plate 117 having an aperture 118 therein, a lens 119 and a reflecting prism 121. It may be noted at this point that a mirror may be substituted for the prism 121, and a prism may be substituted for the mirror 21 in the embodiment illustrated in FIG. 1.

The rotary mirror 114 includes eight mirror sections 122 arranged octagonally about the outer periphery of the rotary member 123. For clarity, the means for rotating the rotary member 123 are not illustrated, but may be the same as used in the previously described embodiment. As the mirror rotates, the light path passing through the aperture 118 and illustrated by the lines 131, 132 and 133 acts in a manner similar to that of the previous embodiment, sweeping along the surface 112 from left to right.

Under some circumstances, such as due to inexact placement of the objects 134 on the conveyor 136, it may not be possible to adjust the cut-off of the input to the voltage detector at the precise end of the sensing period. One way in which spurious response is avoided under such circumstances is illustrated in FIG. 5. An illuminated member consisting of a plate 201 of diffused glass is placed so that, when the mirror is in the position indicated in phantom and the light path therefore does not include part of the surface 112, the light path intercepts the diffused glass 201. This is illustrated by the dotted extension of the line 131. A suitable lamp 202 is connected to a power supply, not illustrated, through a variable control 203. The illumination level of the lamp is such that the diffused glass surface is approximately the same illumination level as the surface 112 of the object 134. Accordingly, no spurious response occurs in the electrical circuitry.

The vertical surface 204 of the object 134 is scanned by means of a photomultiplier 206. The photomultiplier sees a small area of the surface 204 through an aperture 207 in an opaque plate 208. A lens 209 is aligned with the aperture 207, thereby forming an image producing means 211 similar to the image producing means 111. Another of the panels or sections 122 on the mirror 114 is used to reflect the light of a prism 212 which, in turn, reflects the light onto the surface 204. As the mirror 114 turns, the light path of the area which is sensed is swept over the surface 204. In this connection, spurious response does not result from overtravel since, when the mirror 114 is in the position shown in phantom so that overtravel of the light path results, the photomultiplier 206 merely sees the top surface 112 of the object, as shown by the dotted line in FIG. 5, which surface is illuminated at substantially the same level as the surface 204.

Figure 6:
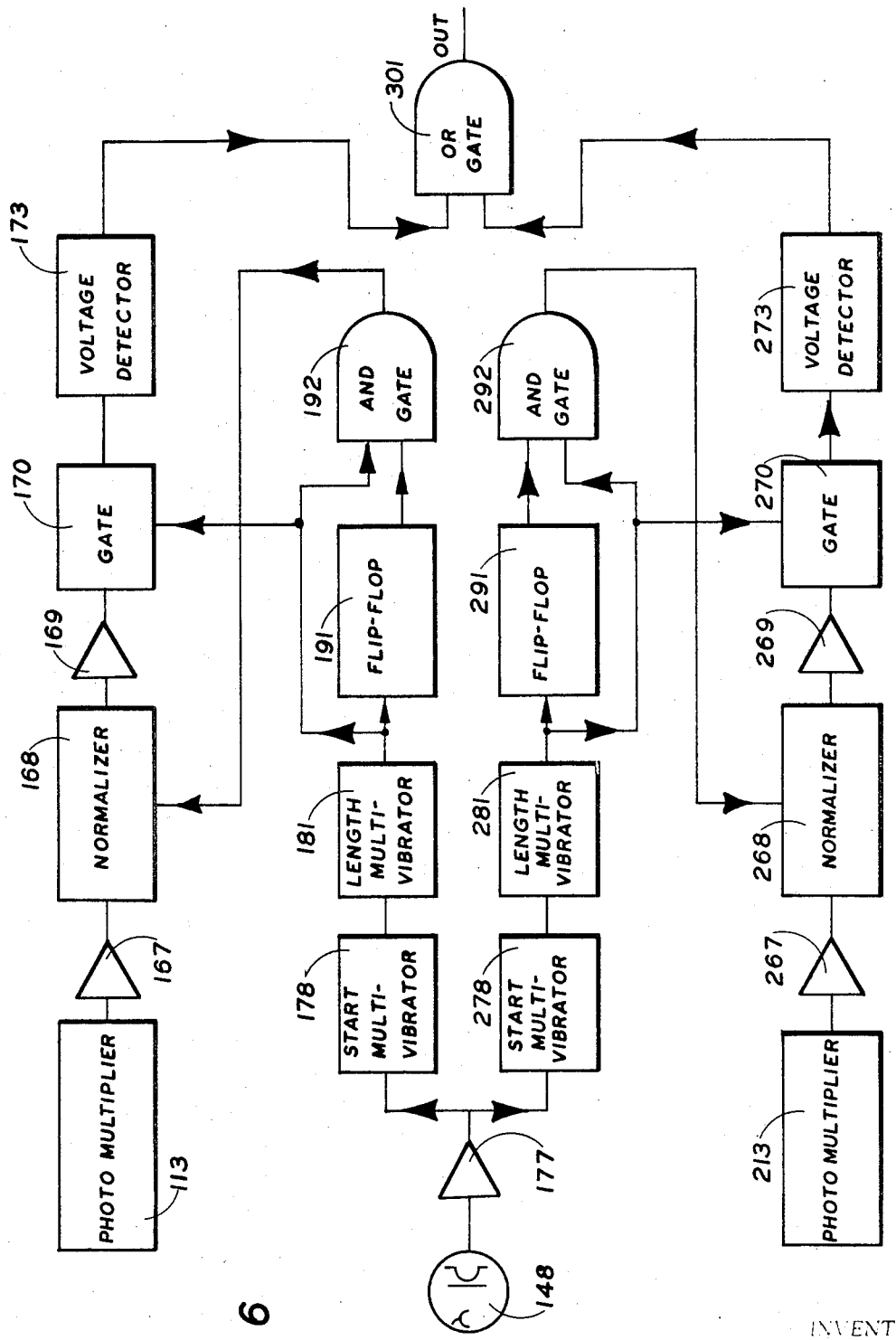
FIG. 6 is a block diagram of electrical circuitry used with the apparatus of FIG. 5.

The electrical circuitry for the embodiment of FIG. 5 is illustrated in FIG. 6. Those items in FIG. 6 which are identical to items in FIG. 3 are given the same reference numbers preceded by a 1. In the embodiment of FIG. 6, a second channel for the side surface scan is also provided. This second channel is identical to the first channel and the elements thereof are given identical numbers preceded by a 2. A single gating photocell 148, not illustrated in FIG. 5, is utilized for both channels. The gating photocell 148 applies signals to the two sets of gating multivibrators through an amplifier 177. The outputs of the voltage detectors 173 and 273 are applied to the rejection device or similar mechanism, not shown, through an OR gate 301. In the event a blemish is detected by either scanning channel, a rejection signal will be produced.

The illumination for the embodiment of FIGS. 5 and 6, which is not illustrated, may comprise suitable illumination lamps used in combination with condensing lenses and reflecting prisms in the manner illustrated in FIG. 2. Thus, uniform lighting may be achieved for the surfaces being inspected even though there may be irregularities in such surfaces.

It may therefore be seen that the apparatus of the invention affords a sensitive and accurate means for inspecting surfaces for blemishes. The apparatus is relatively low in cost, provides a rapid response and is automatically normalized to take into account fluctuating light level. Problems associated with the vignetting of lenses are minimized, and the apparatus may be adapted to scan several sides of an object simultaneously.

Various modifications of the invention will become apparent to those skilled in the art from the foregoing description and accompanying drawings. Such modifications are intended to fall within the scope of the appended claims.

What is claimed is:

1. Apparatus for detecting blemishes on a surface, comprising, means for producing an image of an illuminated area of the surface which is about equal in area to the area of an image of the smallest blemish to be detected, means for sensing the illumination level of the image, reflecting means positioned in a light path between the surface and said image producing means, means for moving said reflecting means in a predetermined sweep pattern to change the imaged area of the surface which said sensing means sees, and means exclusive of said reflecting means for illuminating the surface in the imaged area.

2. Apparatus according to claim 1 wherein said image producing means comprise lens means and aperture means positioned with respect to each other and said sensing means such that said aperture means define the area of the surface which is imaged.

3. Apparatus according to claim 1 wherein said sensing means include a photomultiplier.

4. Apparatus according to claim 1 wherein said reflecting means include a mirror comprising a plurality of planar sections arranged about a support member, and wherein said moving means comprise means for rotating said support member.

5. Apparatus according to claim 4 wherein said illuminating means include a fixed light source and fixed reflecting means positioned adjacent said support member for directing light to illuminate the surface at a path of incidence nearly parallel with the optical path.

6. Apparatus according to claim 2 wherein said image producing means further include further reflecting means, said further reflecting means being positioned to provide a light path between said lens means and said reflecting means.

7. Apparatus according to claim 1 including an illuminated member adapted to be positioned adjacent the surface to intercept the light path when said reflecting means are moved sufficiently to cause the light path to miss the surface.

8. Apparatus for detecting blemishes on a surface, comprising, a photomultiplier, means adjacent said photomultiplier and defining an aperture of a predetermined size, a mirror adapted to be positioned to provide a light path between the surface and said aperture means for producing an image in the plane of said aperture means, said aperture means defining an aperture which is about equal in area to the area of an image of the smallest blemish to be detected, and means for moving said mirror in a predetermined sweep pattern to change the imaged area of the surface which the photomultiplier sees.

9. Apparatus according to claim 8 wherein said mirror includes a plurality of planar sections arranged about a support member, wherein said moving means comprise means for rotating said support member, and including conveyor means for moving the surface in a direction which is approximately parallel with the axis of rotation of said support member.

10. In optical scanning apparatus, a normalizing circuit for providing a reference voltage level, said circuit including a coupling capacitor series connected in the signal path of the optical scanner, a source of bias potential at a predetermined level, an electronic switch for connecting said source to said capacitor to maintain a charge thereacross referenced to the bias potential, and synchronizing means for periodically closing said switch to effect coupling of the bias potential to said capacitor.

11. Apparatus for detecting blemishes on a surface, comprising, means for producing an image of an area of the surface which is about equal in area to the area of an image of the smallest blemish to be detected, means for sensing the illumination level of the image, reflecting means positioned to provide a light path between the surface and said sensing means, and means for moving said reflecting means in a sweep pattern to change the imaged area of the surface which the sensing sees, the sweep distance being substantially greater than the dimension of the surface traversed, and means for disabling said sensing means during the portions of the sweep of said reflecting means beyond the surface.

12. Apparatus for detecting blemishes on a surface comprising, means for producing an image of an area of the surface which is about equal in area to the area of an image of the smallest blemish to be detected, means for sensing the illumination level of the image, reflecting means positioned to provide a light path between the surface and said sensing means, means for moving said reflecting means in a linear sweep pattern to change the imaged area of the surface which the sensing means sees, means for moving the surface in a direction which is transverse to the direction of sweep a distance approximately one-half the width of said image with each sweep of said reflecting means, and means for normalizing said sensing means to a reference level every other sweep of said reflecting means.

13. Apparatus according to claim 12 wherein said normalizing means include means for synchronizing with the movement of said reflecting means.

14. Apparatus according to claim 13 wherein said synchronizing means include a gate circuit and optical sensing means responsive to a predetermined position of said reflecting means to trigger said gate circuit.

References Cited
UNITED STATES PATENTS 3,198,951   12/1968   Lentze _____ 250—219

RALPH G. NILSON, Primary Examiner

M. ABRAMSON, Assistant Examiner

U.S. Cl. X.R.
250—236